United States Patent [19]

Dunkerton et al.

[11] Patent Number: 4,772,887
[45] Date of Patent: * Sep. 20, 1988

[54] INDIVIDUAL SIMULCAST STATION CONTROL DECODER

[75] Inventors: Stephen H. Dunkerton, Riverwoods; Gary D. Erickson, Mt. Prospect; Scott G. Chapman, Schaumburg, all of Ill.; Gary R. Reynolds, Twin Falls, Id.

[73] Assignee: Motorola, Inc., Schaumburg, Ill.

[*] Notice: The portion of the term of this patent subsequent to Feb. 10, 2004 has been disclaimed.

[21] Appl. No.: 520,779

[22] Filed: Aug. 5, 1983

[51] Int. Cl.$^4$ .............................................. H04Q 1/00
[52] U.S. Cl. ........................... 340/825.48; 340/825.47; 455/92
[58] Field of Search ...................... 340/825.44, 825.47, 340/825.48, 825.07; 455/92, 95, 15, 58, 68; 179/18 BF; 371/46, 45; 370/111

[56] References Cited

U.S. PATENT DOCUMENTS

| | | | |
|---|---|---|---|
| 3,311,704 | 3/1967 | Filipowsky et al. | 370/111 |
| 4,131,849 | 12/1978 | Freeburg, et al. | 455/58 |
| 4,323,881 | 4/1982 | Mori | 340/825.48 |
| 4,398,192 | 8/1983 | Moore et al. | 340/825.44 |
| 4,418,416 | 11/1983 | Lese et al. | 455/603 X |
| 4,431,991 | 2/1984 | Bailey et al. | 340/825.47 X |
| 4,642,633 | 2/1987 | Dunkerton et al. | 340/825.48 X |

Primary Examiner—Ulysses Weldon
Attorney, Agent, or Firm—Winfield J. Brown, Jr.; Joseph T. Downey; Anthony J. Sarli, Jr.

[57] ABSTRACT

A paging simulcast station remote control system decoder. The paging system decoder responds to signals generated in accordance with a predetermined signalling scheme comprising a series of tones and timed pauses. The decoder is also responsive to user programmable switches which provide station function tone and sector information. The paging system decoder then selectively deactivates a paging simulcast transmitter in response to signals received through a conventional paging communication link.

18 Claims, 15 Drawing Sheets

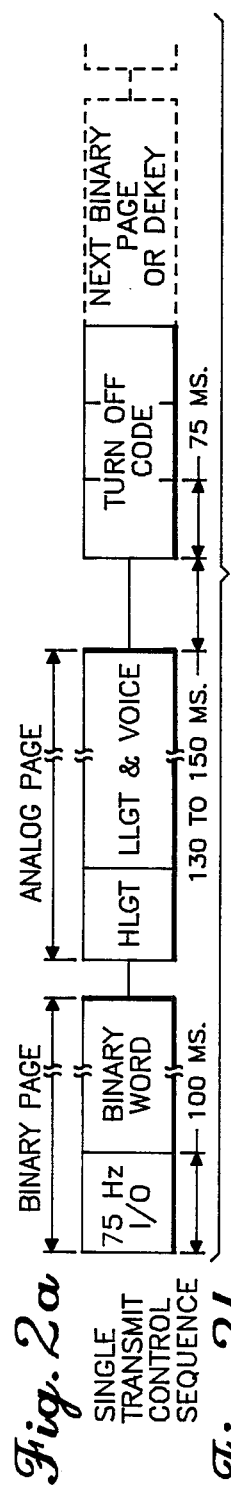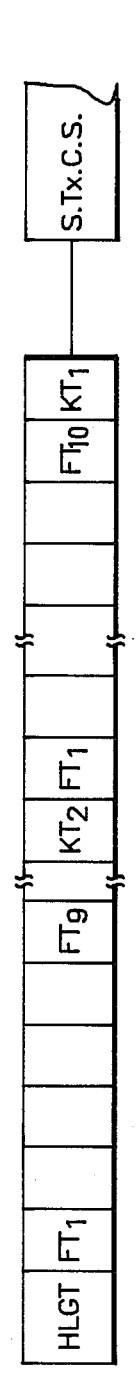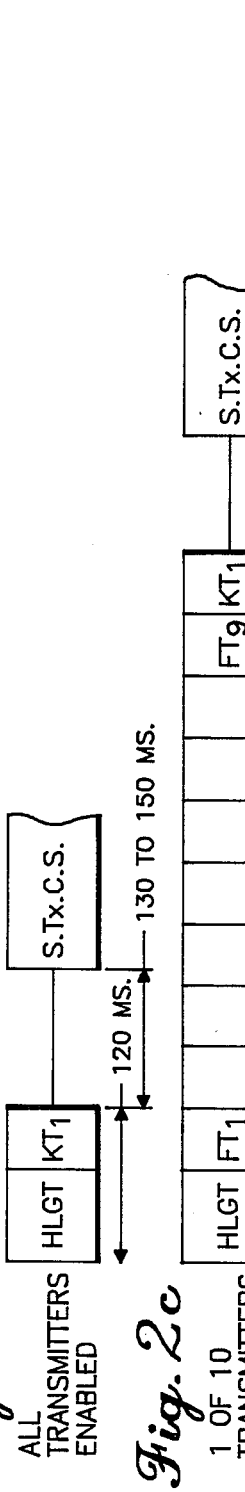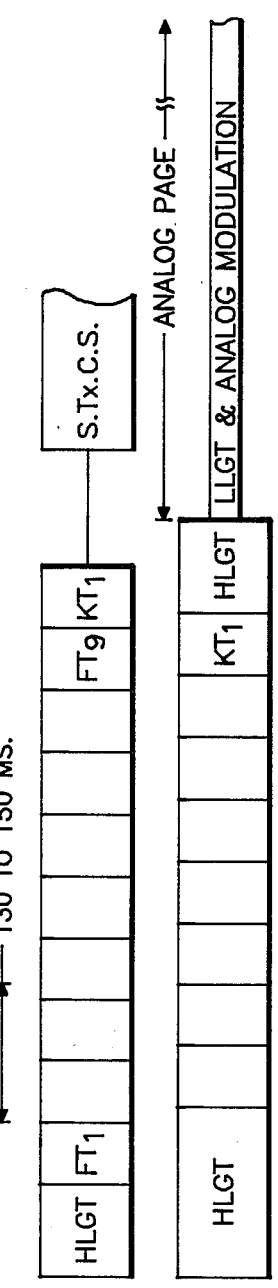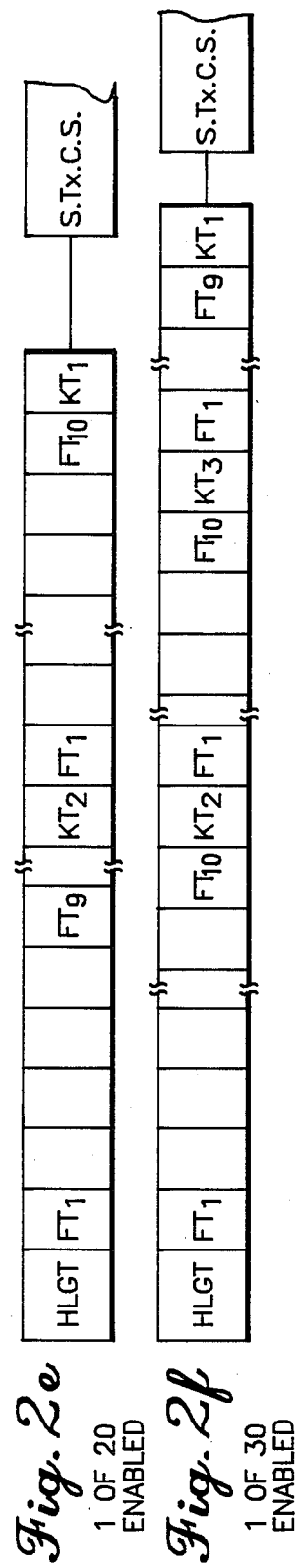

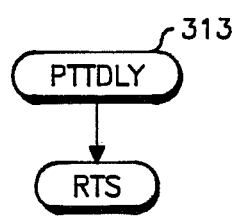
Fig. 14a
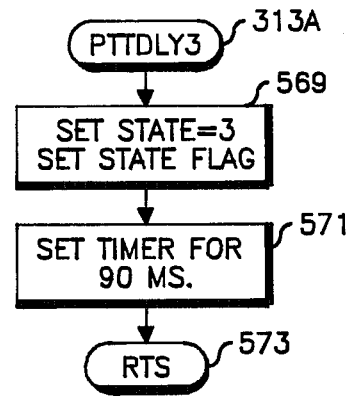
Fig. 14b
Fig. 15b
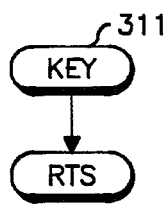
Fig. 15a
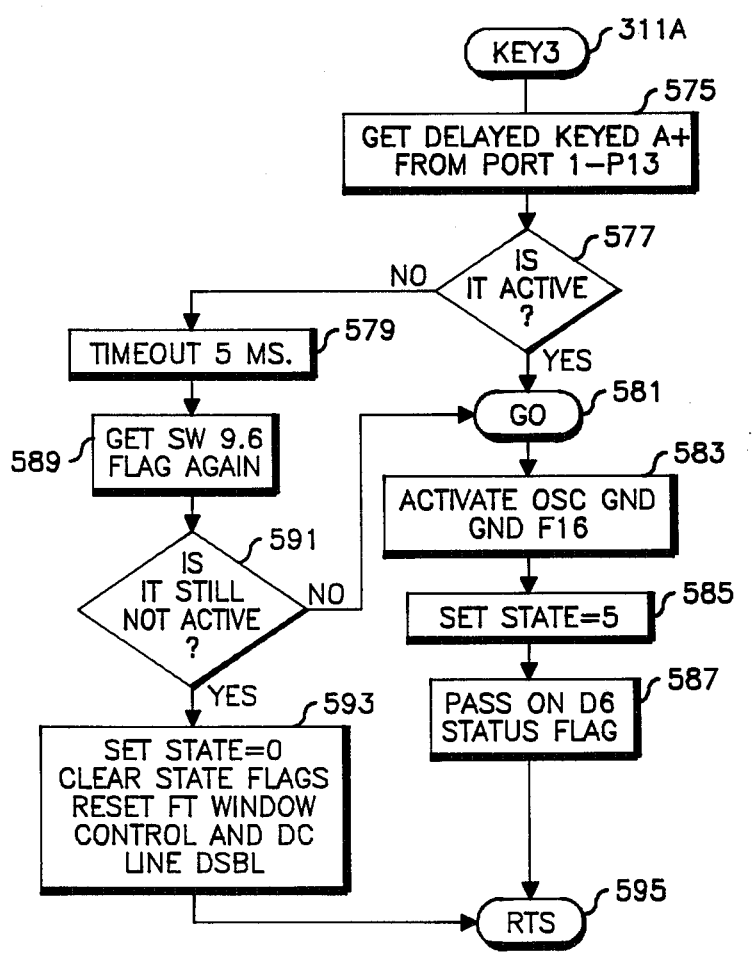

INDIVIDUAL SIMULCAST STATION CONTROL DECODER

BACKGROUND OF THE INVENTION

This invention relates to the field of paging simulcast transmission systems and specifically to a simulcast transmission system in which each individual simulcast transmitter in the system can be individually activated or "knocked down" in response to a signal from a paging terminal or central controller.

In the past simulcast transmission systems have incorporated transmitting stations which remained activated while the simulcast system was in use. Individual remote station control systems have not been developed with efficient signalling schemes.

Wide area coverage systems employing multiple transmitters on the same RF channel are gaining wider acceptance due in part to the growth of personal paging activity. Simulcast transmission systems require that each transmitter in the system produce a signal of substantially identical frequency and modulation. This requires that the transmitting stations in a simulcast system be periodically adjusted so that critical system parameters are satisfied. One method of calibrating a simulcast transmission system is to selectively deactivate certain transmitters in the system while active transmitters are adjusted. In a typical prior art simulcast transmission system, service personnel would be stationed at each individual transmitter location, and would communicate through a separate telephone line or RF channel while manually activating and deactivating remote simulcast transmitters to effect the calibration procedure. Prior art simulcast systems have not included any means for individually efficiently and remotely controlling simulcast transmitters through a conventional simulcast system link.

In addition, individual simulcast transmitter control is useful in a simulcast system which is designed to generate multiple signalling schemes. A simulcast transmitter which can generate both binary and analog signalling formats, can be configured for individual station control and provide a truly universal paging system with controllable area coverage. For instance, simulcast system would typically be configured to provide wide area coverage in a certain area. However, paging subscriber may desire service in only a portion of the total available area, for instance at a large construction site in a certain sector of a city. A simulcast transmission system with individual station control can provide service to the limited area subscriber without requiring the subscriber to pay a fee based on broad area coverage. In other words, another benefit of individual station control is the ability to sector paging coverage based on different tariff structures.

SUMMARY OF THE INVENTION

Briefly described, the present invention contemplates a paging remote control system decoder which interfaces with a paging transmitter. The system decoder decodes a series of tones and timed pauses generated by a paging system encoder, in cooperation with programmable switches located within the system decoder. The programmable switches within the system provide group information utilized in decoding the signalling scheme.

The paging system decoder then selectively activates or deactivates a paging transmitter in accordance with the signalling scheme. The signals are formatted to instruct specific paging stations within the paging simulcast system to transmit or not transmit as instructed by the paging system encoder.

According to the signalling scheme of the present invention, the paging system encoder will generate a high level guard tone signal which instructs the remote simulcast transmitters that paging signal is imminent. The paging system encoder then generates a group of up to 10 function tones to instruct individual simulcast transmitter station that they should not transmit the subsequent paging signal. The function tone sequence is terminated by the transmission of a keying sequence tone.

Each paging system decoder is configured to be capable of decoding one of a total of thirty individual simulcast transmitter control tones through repeated use of the function tone sequence. Addressing more than ten simulcast transmitters requires that each function tone sequence be delineated by a unique keying sequence tone. Any number of stations up to 30 can be addressed by sending the sequence of high level guard tones followed by function tones delineated keying sequence tones.

It is, therefore, an object of this invention to provide a paging simulcast remote control system decoder capable of selectively deactivating any simulcast remote transmitter used in the simulcast system, in response to signals generated by a paging system encoder in accordance with a predetermined signalling scheme.

It is a further object of the present invention to provide a decoder capable of decoding a collapsing signalling scheme where only the specific transmitter disable tones are transmitted.

It is yet another object of the present invention to provide a paging simulcast remote control system decoder which can decode control information which is interlaced with conventional paging information thereby eliminating the need for additional control lines.

It is still another object of the present invention to provide a paging simulcast remote control decoder which can be programmed to provide variable sector coverage.

BRIEF DESCRIPTION OF THE DRAWINGS

FIGS. 5 through 11 and 12A–16B are flow diagrams which define the operation of the microcomputer used in the encoder of FIG. 3.

DETAILED DESCRIPTION OF THE PREFERRED EMBODIMENT

Figure 1:
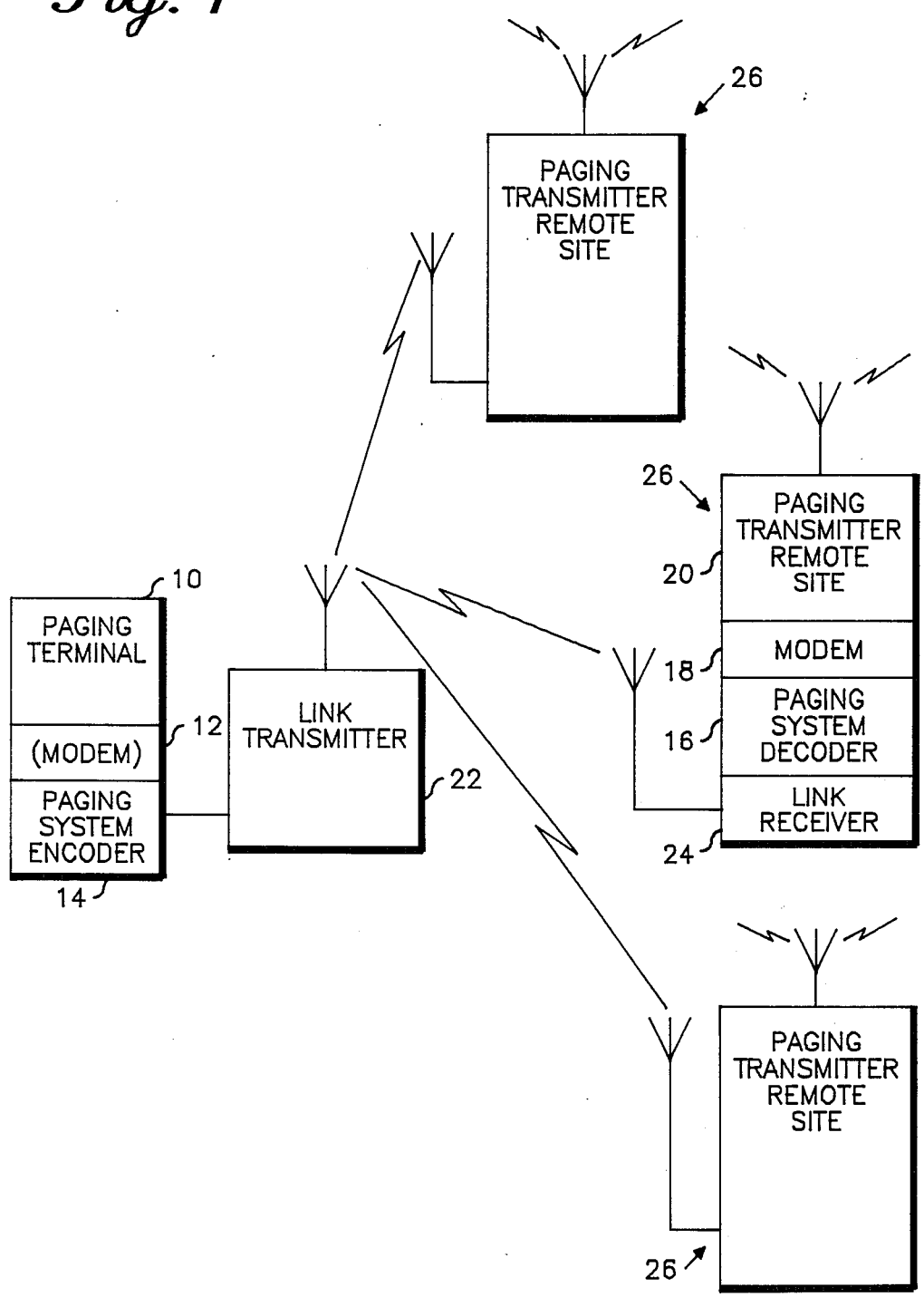
FIG. 1 is a block diagram of a paging system of the type which will embody the preferred practice of the present invention.

FIG. 1 shows a block diagram of a paging system of the type which embodies the signalling scheme utilized in the present invention. The illustrated paging system includes a paging terminal (10) adapted to provide analog or binary paging signals. The paging terminal interfaces with a modem 12 and a paging system encoder 14. The modem 12 is a conventional device which converts a binary signal from the paging terminal 10 to a frequency-shift keying (FSK) signal used by the station encoder 14. The paging terminal 10 cooperates with the paging system encoder 14 by providing signals to the encoder 14 which indicate that the paging terminal 10 is about to transmit binary or analog signals. The encoder 14 then signals the paging terminal 10 when the encoder is ready to receive either type of signalling. An exact description of the paging terminal and the interface signals required by the paging system encoder are described in Motorola document 68P81063E15 (1982) entitled "Simulcast System Controller and PURC Station Controller" available from the Service Publication Department of Motorola, Inc., 1301 East Algonquin Road, Schaumburg, Ill., or from Motrorola C & E Parts, 1313 East Algonquin Road, Schaumburg, Ill.

The encoder 14 then generates a series of tones and timed pauses which are especially formatted and communicated to a paging base station which includes station decoder 16. The paging encoder is described in copending patent application Ser. No. 520,778 entitled "Individual Simulcast Transmission System Control Encoder" by Stephen Dunkerton et al and is assigned to the assignee of the present invention. The decoder 16 converts the formatted signals from the encoder 14 and selectively activates modem 18 and transmitter 20 in predetermined timed sequences as determined by the signals from the encoder 14. The paging transmitter 20 can then be selectively switched off or turned on in response to the signals received from the encoder 14.

The signalling scheme shown in FIG. 2 has been developed to unify the base station control functions required in paging systems utilizing the individual station control feature. The signalling scheme shown in FIG. 2 shows a control tone sequence comprising a matrix of function tones inserted between a high level guard tone and one or more keying sequence tones. The matrix of function tones is used to disable undesired stations. The control tones which are sent are determined by sector select programming or individual station control switches connected to the paging system encoder.

Each simulcast transmitter station is assigned a group and disable function tone. The signalling scheme is designed to produce a total of 10 individual function tones and three group or keying sequence tones. The simulcast transmitter decoder is designed to respond to the appropriate keying sequence and function tones. If the appropriate combination of tones is received, the station remains disabled until the system is dekeyed, then any disabled simulcast transmitter decoder control modules are reset.

The individual station control scheme is designed to be inserted into a second signalling scheme which allows a paging simulcast transmitter to key in an analog or binary mode. The individual station control scheme begins with the transmission of a high level guard tone signal and terminates with a keying sequence tone. The mode keying control sequence begins with the next control tone. The exact operation of the mode keying signalling scheme is described later in this application and a detailed description is shown in pending patent application Ser. No. 487,482 entitled Paging Universal Remote Control System by Stephen Dunkerton et al and assigned to the assignee of the present invention.

The table below shows the function tones associated with each station within a group. Stations 1 through 10 are always associated with group 1, stations 11 through 20 in group 2 and stations 21 through 30 in group 3.

| Station Number | | | Disable FT Frequency |
| --- | --- | --- | --- |
| 1 | 11 | 21 | 1750 Hz |
| 2 | 12 | 22 | 1650 |
| 3 | 13 | 23 | 1550 |
| 4 | 14 | 24 | 1450 |
| 5 | 15 | 25 | 1350 |
| 6 | 16 | 26 | 1250 |
| 7 | 17 | 27 | 1150 |
| 8 | 18 | 28 | 1050 |
| 9 | 19 | 29 | 950 |
| 10 | 20 | 30 | 750 |
| Final Keying Sequence = 1950 Hz | | | |
| Group II Enable = 1850 Hz | | | |
| Group III Enable = 2050 Hz | | | |

Referring now to FIG. 2A, a typical single transmitter control sequence is shown. According to FIG. 2A, a binary paging signal is sent by first sending a first binary pattern of 1's and 0's at a 75 Hz rate for a 100 milliseconds. This pattern is immediately followed by the binary paging signal. An analog signal is transmitted by sending a high level guardtone signal immediately followed by a low level guardtone and voice signal. To terminate the paging sequence, a turn-off code is sent or another binary or analog paging signal could be sent. The signalling scheme of the present invention is inserted prior to the signalling scheme of FIG. 2A for stations equipped for individual station control. The signalling format shown in FIG. 2A is defined as a single transmission control sequence.

FIG. 2B shows the required signalling of the present invention for a simulcast transmission system utilizing two to thirty transmitters where it is desired that every transmitter in the system transmits the subsequent paging signal. As mentioned earlier, each station is equipped to decode one of ten disabling function tones, as well as one of the three keying sequence tones. Each transmitter is also equipped to decode final keying sequence tone 1 or 1950 Hz. Therefore, according to FIG. 2B, the individual station control sequence is initiated by sending a high level guardtone signal. Since every station is to transmit, no function tones are sent and the high level guardtone signal is immediately followed by the keying sequence tone which signals the end of the function tone sequence. After a pause of 120 ms, a single transmission control sequence could be sent.

FIG. 2C shows a tone sequence which will instruct a ten-transmitter system to disable every transmitter, except a single transmitted. The control sequence is initiated by sending a high level guardtone signal followed by a series of function tones with each function code corresponding to a transmitter station to be disabled. The function tone sequence is terminated by a keying sequence tone which is followed by a pause and then a typical single transmission control sequence.

FIG. 2D shows the control sequence required for controlling as many as ten simulcast transmitters when an analog paging signal is the first paging signal to be transmitted.

FIGS. 2A, 2B and 2C have assumed that a single transmitter control sequence begins with a binary page. According to the paging universal remote control scheme described in the above-mentioned patent, a binary page is initiated by a period of pause followed by a 75 Hz signal of binary 1's and 0's as described above. However, if an analog paging signal is to be the first signal transmitted after the simulcast transmitter control sequence, the paging system encoder must follow the last keying sequence tone with a period of high level guardtone which is immediately followed by a low level guardtone and analog modulation signal as shown in FIG. 2D.

FIG. 2E shows the individual station control sequence required when as many as twenty transmitters are to be individually controlled. According to FIG. 2E, the transmitter control sequenc is initiated by sending a period of high level guardtone followed by a group of 1 to 10 function tone signals corresponding to group one. The group one function tone sequence is then terminated by the transmission of a group two enable tone. As many as ten function tones can then be sent which are associated with the transmitters configured in group two. The group two function tone sequence is then terminated by the keying sequence tone 2 which can then be followed by a pause immediately followed by a single transmitter control sequence. If an analog paging mode was desired, the final keying sequence tone could then be followed by a second high level guardtone signal, and then a low level guardtone accompanied by an analog modulation signal.

FIG. 2F shows the control tone sequence which would be required to control as many as thirty simulcast transmitters. According to FIG. 2F, the control tone sequence is initiated by the transmission of a high level guardtone signal immediately followed by the first grouping of function tone signals. The first group of function tone signals is then terminated by the transmission of a first keying sequence tone KT2, which is also a group two enable tone. The next grouping of function tone signals are then terminated by a second keying sequence tone KT3. The third grouping of function tone signals can then be sent terminated by a final keying sequence tone (KT1) 1950 Hz which signals the end of the entire keying sequence. The final keying sequence tone can then be followed by a pause and a single transmission control sequence or an analog paging signal whereby a period of high level guardtone is sent followed by a period of low level guard tone accompanied by subsequent analog paging signal.

Figure 2G:
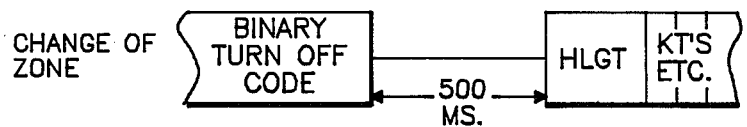
FIGS. 2A–2G show the signalling scheme which unifies the operation of the encoder and decoder of the present invention.

FIG. 2G shows the relationship between the time interval required between the last binary paging signal and the first change of transmitter control information. According to FIG. 2G, after the last binary paging signal has been transmitted, the paging encoder must pause for at least 500 ms before retransmitting a high level guard tone signal to allow the paging system decoder to begin searching for the high level guardtone signal.

Figure 2H:
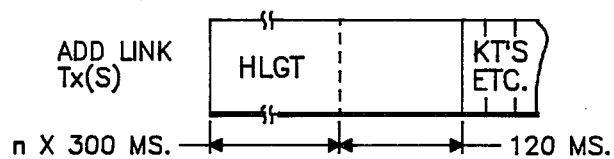

FIG. 2H shows a relationship between additional transmitter link stations located in the distribution paths of the paging control sequence signal. In order to expand the range of a paging simulcast system, occasionally link transmitters are employed. For every additional link transmitter employed in the paging system, an additional 300 ms period of high level guardtone must be added to the paging transmitter control tone sequence.

Figure 3:
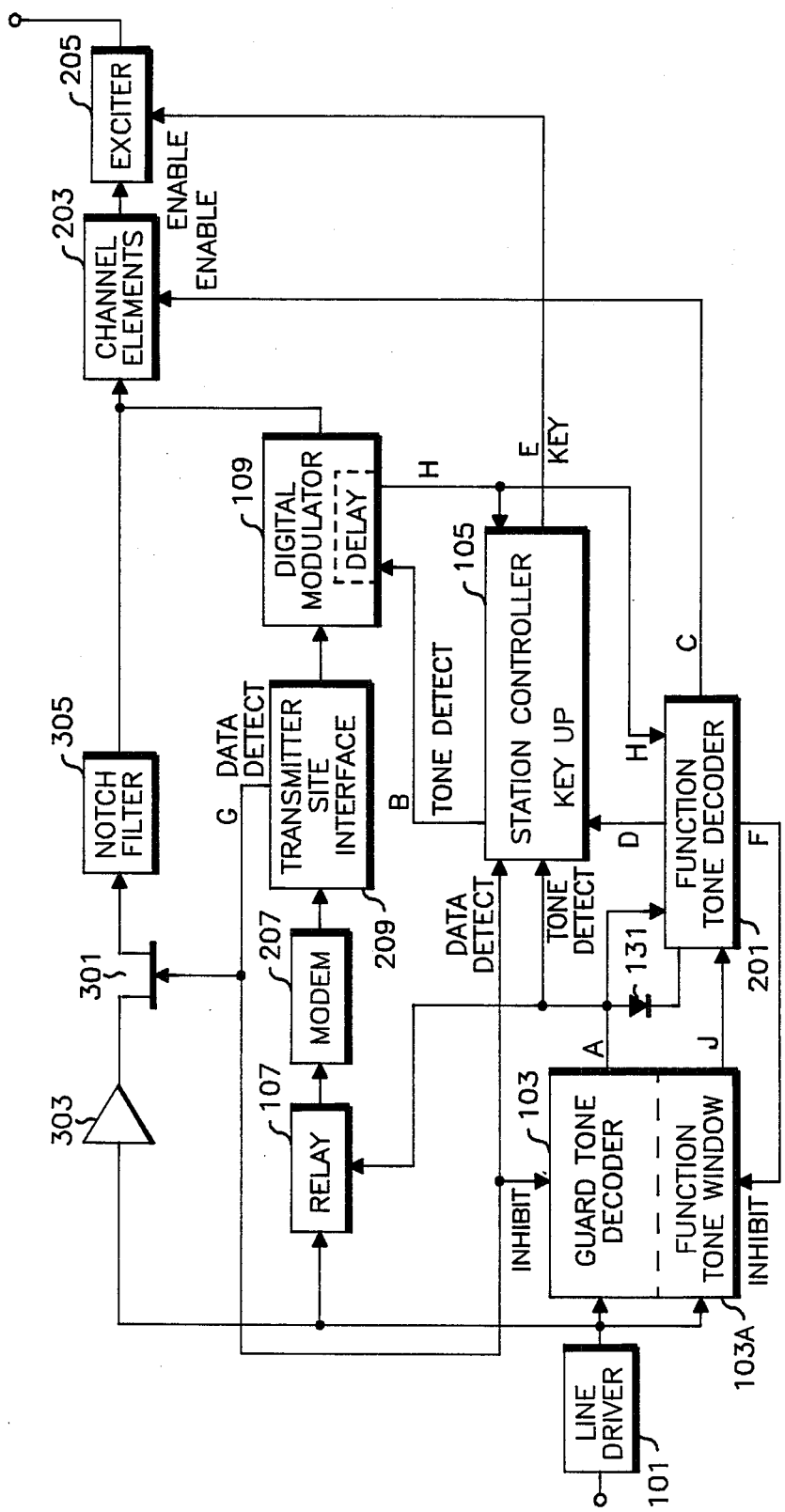
FIG. 3 is an electrical schematic of the decoder which decodes the required signalling scheme of the present invention.

FIG. 3 shows a block and circuit diagram for the paging remote station system decoder that is responsive to the signalling scheme described in FIG. 2. A more detailed electrical schematic for the remote station decoder is illustrated in Motorola document 68P8106E70, published May, (1982) entitled "PURC Paging Stations" available from the Service Publication Department of Motorola, Inc., 1301 East Algonquin Road, Schaumburg, Ill., or from Motorola C & E Parts, 1313 East Algonquin Road, Schaumburg, Ill. The decoder receives the page information from a local or remote terminal at line drive 101. The station is first keyed up when the decoder receives the guard tone-function tone signal from the terminal. The line driver 101 receives the guard tone-function tone and directs it to guard tone decoder 103. The guard tone decoder 103 detects the guard tone frequency and sends a signal A to relay 107 and the station controller 105 which in turn outputs a signal B to a digital modulator 109. Upon detection of a high level guard tone by the guard tone decoder 103, the guard tone and subsequent keying sequence tone decoder enables function tone window 103a which allows the function tone to pass to the function tone decoder 201. Upon detection of the keying sequence tone provided no function tone is detailed, the function tone decoder 201 generates an output signal C which is delivered to channel element 203 which activates the channel element in preparation for transmission of a signal. A second output from the function tone decoder provides a signal D to the station controller 105. Signal D tells the station controller to key the exciter in the transmitter provided function tone not decoded and keying sequence tone decoded and thereby fully enable the base station transmitter. Therefore, upon receipt of signal D, the station controller 105 sends a signal E to turn on exciter 205. Signal D is controlled by the function tone decoder 201 and will not be activated if a valid function tone sequence has been received.

Signal A from the guard tone decoder 103 causes relay 107 to open and thus place modem 207 offline. Signal A will be removed from relay 107 and signal B is removed from digital modulator 109 at approximately 130–150 milliseconds after loss of guard tone. Since all analog data is summed with a control tone that corresponds to the guard tone frequency, signal A from guard tone decoder 103 will continue to be applied to the station controller 105 as long as analog data and its guard tone carrier are detected. Therefore, signal A will continue to hold open relay 107 for the duration of guard tone plus an additional time period of approximately 130–150 milliseconds. The function tone decoder 201 disables the function tone window 103a with signal F.

After the guard tone decoder 103 ceases to detect a guard tone, signal A will be removed from the delay enable of station controller 105 within approximately 70 ms. Any further signals received by the line driver from the remote or local terminal will now be seen by the modem 207. The modem 207 will convert the audio FSK received from the terminal to a shifting DC voltage which serves as an input to the transmitter site interface 209.

When the remote transmitter site interface 209 detects active data (active since the modem will consider guard tone as a static data) it will generate a data detect signal G which opens or disables the transmit audio path by way of FET 301. The transmit audio path is defined by amplifier 303, notch filter 305. The notch filter 305 serves to notch out the guard tone frequency. The data detect signal G will remain as long as the transmitter site interface continues to receive binary data from modem 207. Signal G also disables or inhibits the guard tone decoder 103 in order to prevent the falsing of signal A and in addition causes signal B to be applied to digital modulator 109. The transmitter site interface 209 passes the binary data to the digital modulator 109 which modulates the binary data to produce a frequency shift keying-non-return to zero output (FSK-NRZ). The FSK output is applied to the input of element 203 to be transmitted by the base station.

If a voice message is to follow the binary information, another time period pause of approximately 50 milliseconds is introduced into the signalling scheme as described in connection with FIG. 2. This 50 millisecond time pause allows the transmitter site interface 209 sufficient time to remove the signal G from the FET 31 and station controller 105 and guard tone decoder 103. Therefore, after binary data is no longer detected by the transmitter site interface 209, the data detect signal G is removed over approximate 50 millisecond time period. Immediately thereafter, a high level guard tone is again sent to the decoder and detected by the guard tone decoder 103. This causes signal A to be applied to the relay 107 and station controller 105 which in turn causes signal B to be applied to digital modulator 109.

Immediately after the high level guard tone is received, the analog signal on the guard tone carrier is received. The guard tone carrier keeps signal A from guard tone decoder 103 present at the delay input of station controller 105. The presence of low level guard tone keeps signal A applied to relay 107 for the duration of the voice plus the 130–150 millisecond time delay. The voice message is transmitted through the audio path and stripped of the guard tone carrier at notch filter 305. At the completion of the voice message, the guard tone decoder 103 no longer receives and detects a guard tone and therefore signal A to the station controller 105 and relay 107 is removed.

After the loss of signal A relay 107 is closed and the modem 207 is on line to receive any binary data from line driver 101. Removing signal B from digital modulator 109, the digital modulator begins a count of between 275–325 milliseconds at the end of which signal H (which appears immediately upon the appearance of signal B) is removed from the station controller 105 which causes signal E to be taken away from exciter 205. Thus, the station is dekeyed since it nas not received any additional binary or analog information for a delay in signal H for 300 ms.

As long as any of the signals D and H appear at the station controller 105, the output signal E will keep the exciter 205 enabled and thus the base station transmitter keyed up. By the appropriate delay in deactivating signal B, the station controller 105 provides the decoder ability of interactively handling binary pages and analog pages with analog voice.

Figure 4:
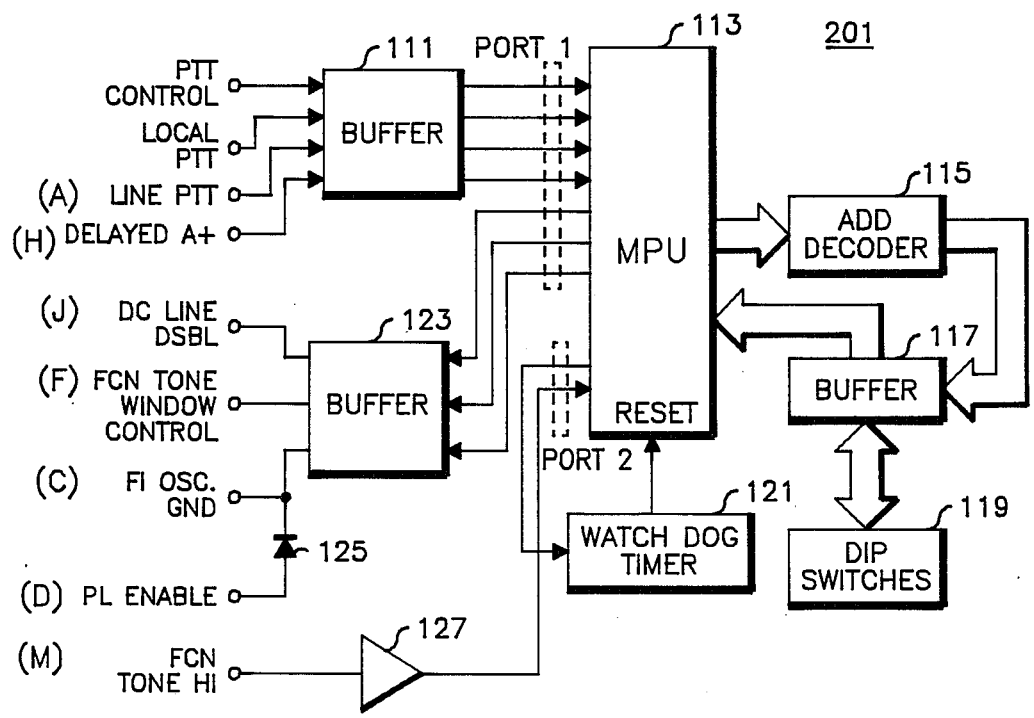
FIG. 4 is a detailed electrical schematic of the function tone decoder of the individual station controller of FIG. 3.

FIG. 4 shows a detailed electrical schematic of the function tone detector module 201 of FIG. 3. The function tone detector consists of a buffer register 111 which interfaces between a microprocessor 113 and the various transmitter keying control inputs. A second buffer register 123 connects between the microprocessor 113 and the paging transmitter control unit of FIG. 3. As noted in FIG. 3, the function tone detector controls the simulcast transmitter output through the buffer 123 outputs. The microprocessor 113 also interfaces with a bank of user programmable switches 119 which are used to select group and function tone identity for a particular simulcast remote site. The microprocessor 113 cooperates with an address decoder 115 and the user programmable dip switches 119 through the buffer 117. The microprocessor 113 also cooperates with a watch dog timer 121 which monitors the microprocessor for abnormal program conditions.

The detailed operation of the microprocessor 113 is defined by the flow diagrams shown in FIGS. 5 through 16. In general however the function tone detector 201 receives incoming function tone signals through buffer 127. These function tone signals are analyzed to determine if a valid disable function tone sequence has been received. If no valid function tones have been received the microprocessor will examine the various PTT control signals and if instructed to do so, will key the transmitter with the appropriate control signals.

If a valid disable function tone sequence has been received, the function tone detector will prevent the simulcast remote station from transmitting.

Figure 5:
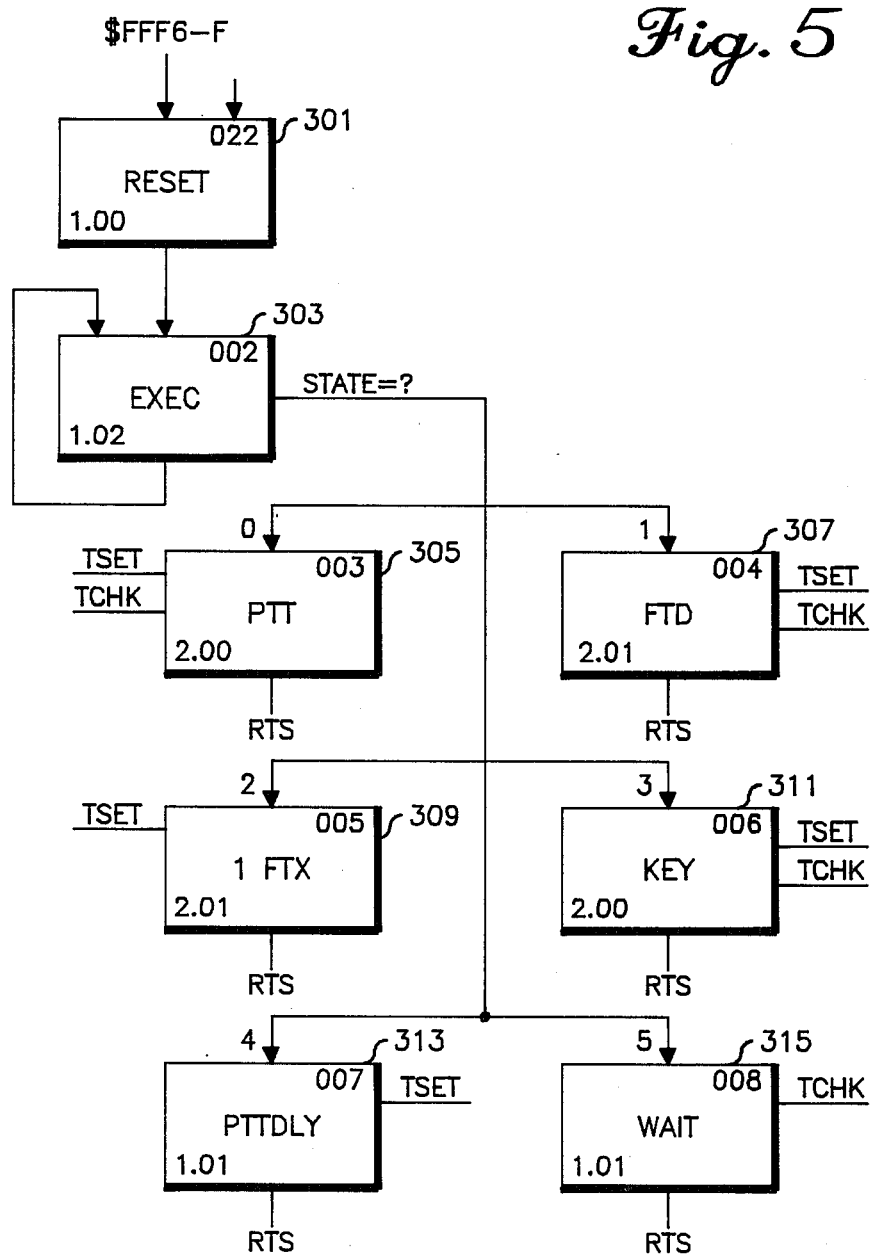

Referring now to FIG. 5, there is shown a structure diagram defining the hierarchical relationships between the various program routines used in the function tone detector shown in FIG. 4. Upon initial activation, the decoder of FIG. 3 will first activate the reset module which initializes the simulcast control module at power-up time. It sets the signalling state to search for a line push-to-talk (A) and passes control to the background loop EXEC module 303. The EXEC module 303 is the underlying simulcast control module and background routing module. This module schedules and calls the background task subroutines that make up the background loop. It also calls the signalling state handler modules which are determined by the value of several of the bits in the state variable byte. If a new state is being entered, the set-up routine for the particular state is called first. After this, other utility background routines are called, and then the whole process repeats indefinitely. Program control passes from the exec module to any of the other six handler modules. Program control can pass from the EXEC module 303 to PTT module 305, to the function tone decode handle module 307, to the function tone executor module 309, to the key-up handler 311, to the line push-to-talk lock-up delay handler 313, or to the simulcast control wait dekey handler module 315. These modules will be discussed in more detail later.

Figure 6:
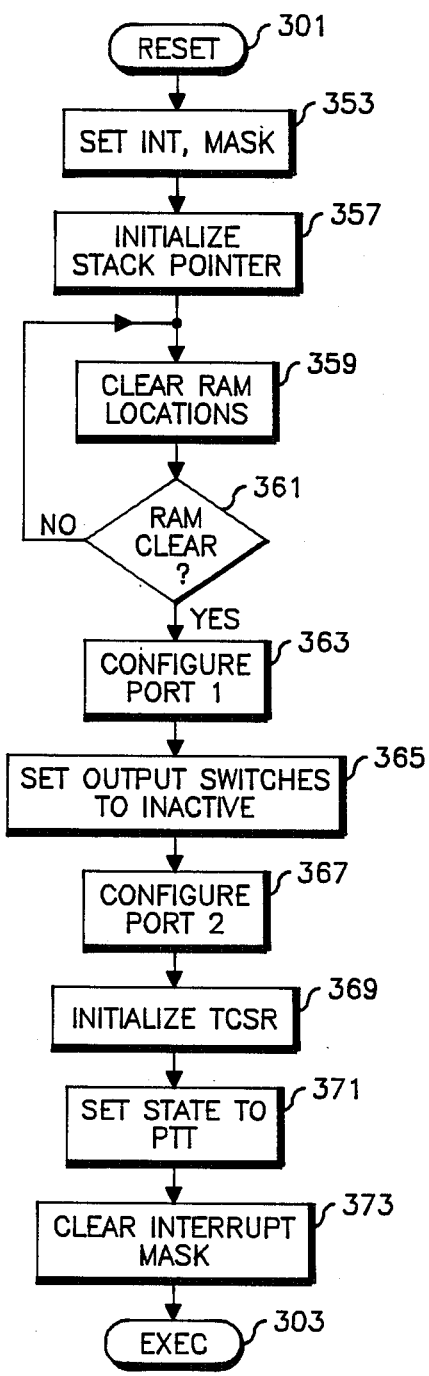

Referring now to FIG. 6, there is shown the reset module 301 of FIG. 5. The reset module 306 initializes the simulcast control module at power-up time. It sets the signalling state to search for line push-to-talk and passes program control to the background EXEC module. The reset module 301 begins with item 353 which sets the microcomputer interrupt mask to prevent interrupt from occurring during the reset power-up sequence. Program control then passes to item 357 which initializes the stack pointer. Item 359 then initializes all the RAM variables in conjunction with decision 361 which continuously clears all RAM locations until every memory location has been cleared. After the RAM variables have been initialized, program control passes to item 357 which defines PIA ports as outputs.

Figure 7:
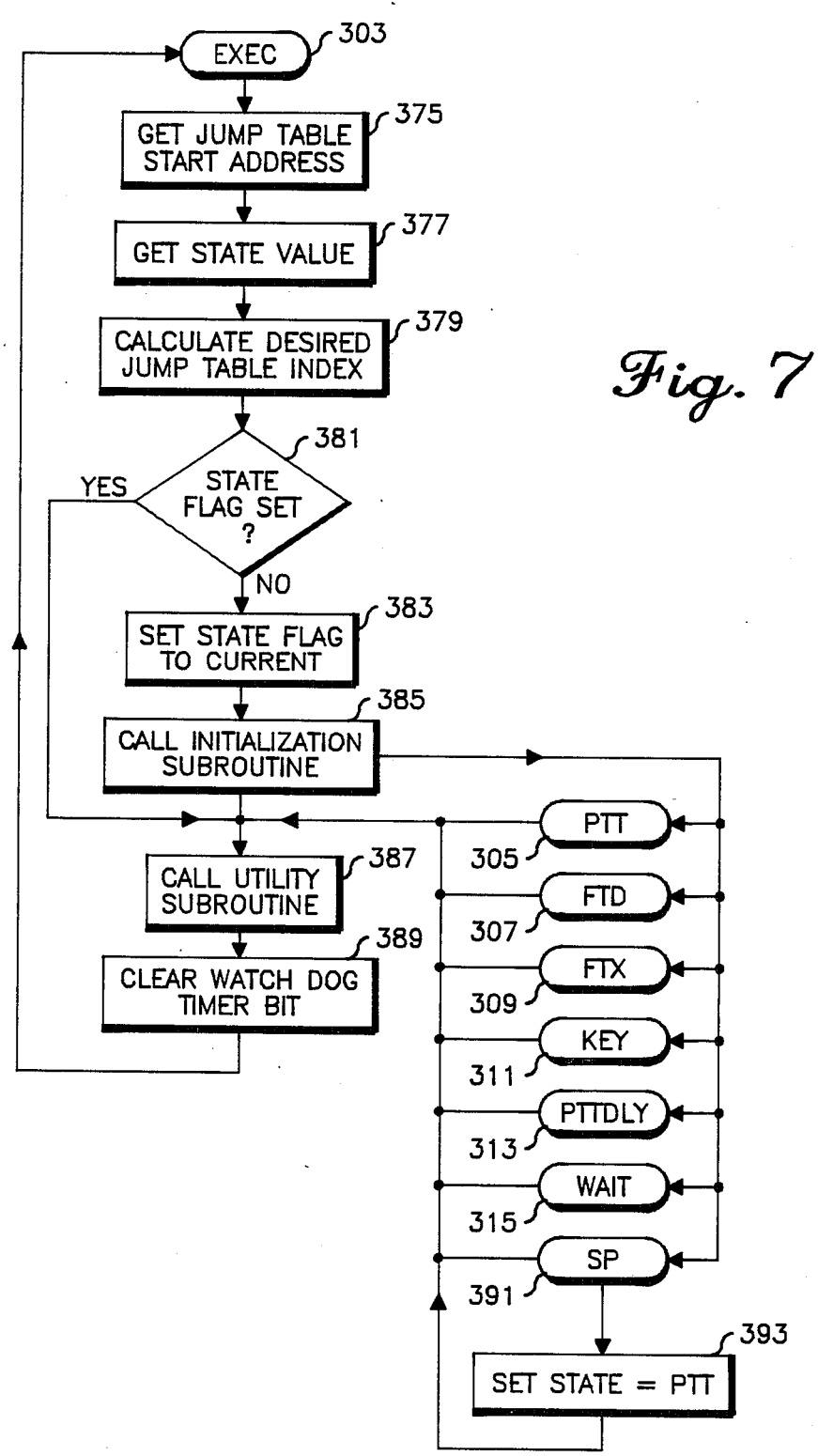

FIG. 7 is a detailed flowchart of the background EXEC module which examines the current state of the individual station control decoder and makes a determination which of the six utility modules should be invoked during the next cycle. EXEC 303 begins with item 375 which examines a memory location which indicates the address of each utility module. Program control proceeds to item 377 which recalls the state variable which defines the current status of the individual station control decoder. Item 379 then calculates which version of the six utility modules should be invoked based on whether the utility module has been previously invoked or not. Decision 381 examines the state variable. If the state variable indicates that the utility has not previously been invoked, program control proceeds to item 383 which updates the state variable to indicate that the utility has been invoked and then proceeds to item 385 which calls initialization subroutine for each of the six utility modules. If the the utility module has been previously invoked, program control will proceed to item 387 which will pass program control to whichever utility subroutine was indicated by the state variable. Item 389 then resets the watchdog timer bit as program control passes to EXEC.

Figure 8:
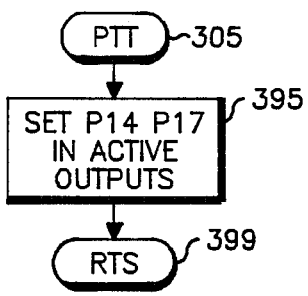

FIG. 8 shows a detailed flow diagram for the PTT utility subroutine 305 shown in FIG. 7. The PTT subroutine module scans the decoder port inputs for a line push-to-talk signal, a local push-to-talk signal or a remote push-to-talk signal as shown in FIG. 4 and sets the CPU state variable to key up the transmitter or to prepare to receive a function tone, i.e., enable the function detector according to the inputs received. The PTT subroutine is a two-pass routine. That is, on the first pass, PTT 305 begins with item 395 which initializes the ports P14 and P17. Then program control returns to the EXEC routine shown in FIG. 7. On the second and subsequent passes, program control will proceed directly to PTT plus 3 (401) in FIG. 9

Figure 9:
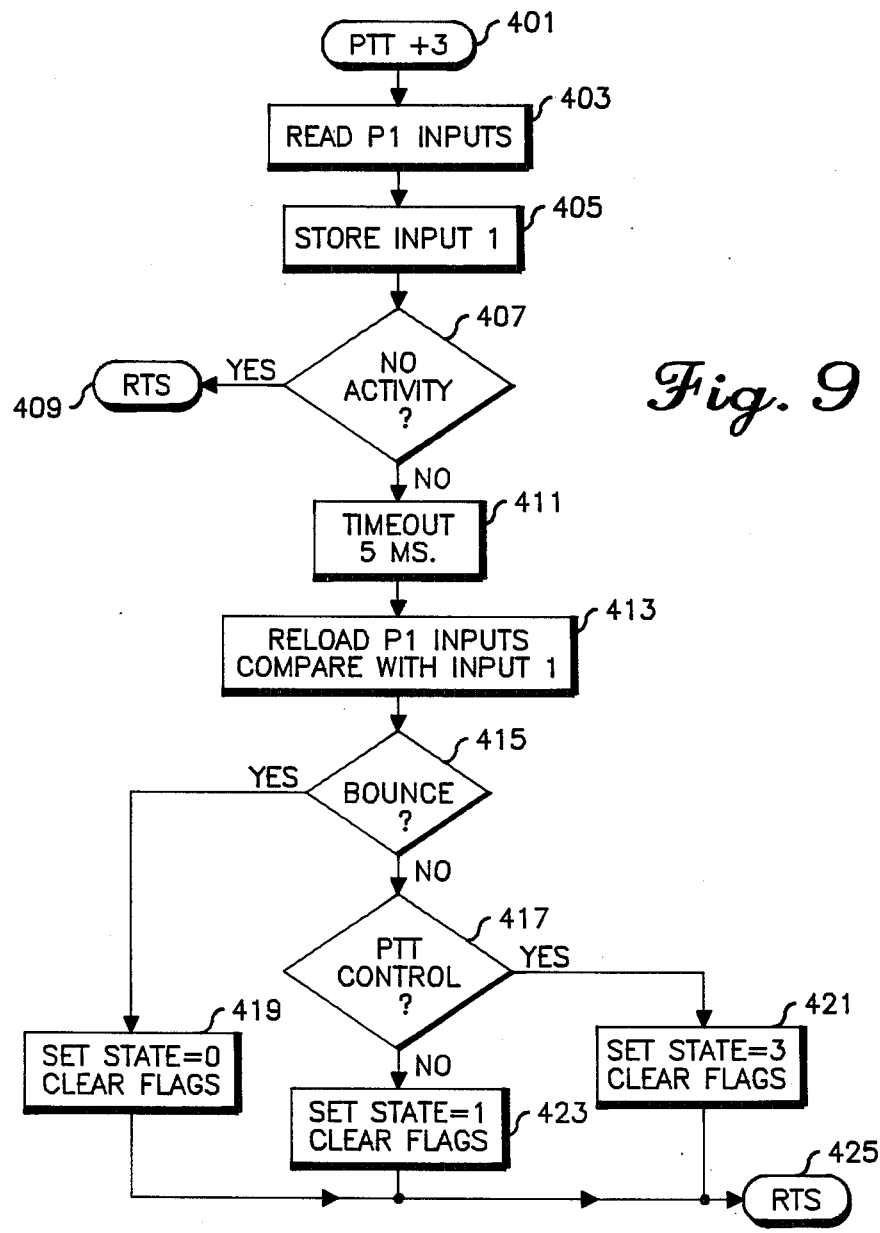

FIG. 9 shows a detailed flow diagram for the PTT+3 routine. PTT+3 begins with item 403 which reads the appropriate PTT inputs from the PIA port, and item 405 stores this information in a RAM location. If no activity has been indicated, program control will return to the EXEC subroutine of FIG. 7 through item 409. If activity has been indicated, item 411 generates a 5 ms time delay for the purposes of detecting a switch bounce. Item 413 then reloads the PIA inputs and compares with the values received before the 5 ms delay. If these values do not agree, i.e., if a switch bounce has been detected, decision 415 will pass program control to item 419 which resets the state variable to zero and clears the state flag. Item 419 then passes program control to the background exec module of FIG. 7. If the switch bounce was not detected, decision 417 examines the PIA inputs and decides if the local PTT signal or PTT control signal has been detected. If so, item 421 sets the state variable equal to three, clears the flags and returns program control to the background exec module. If a PTT has not been indicated a line PTT is indicated and, decision 417 passes program control to item 423 which sets the state variable equal to one, clears the flags and returns program control to the background EXEC module 303 of FIG. 7.

Figure 10:
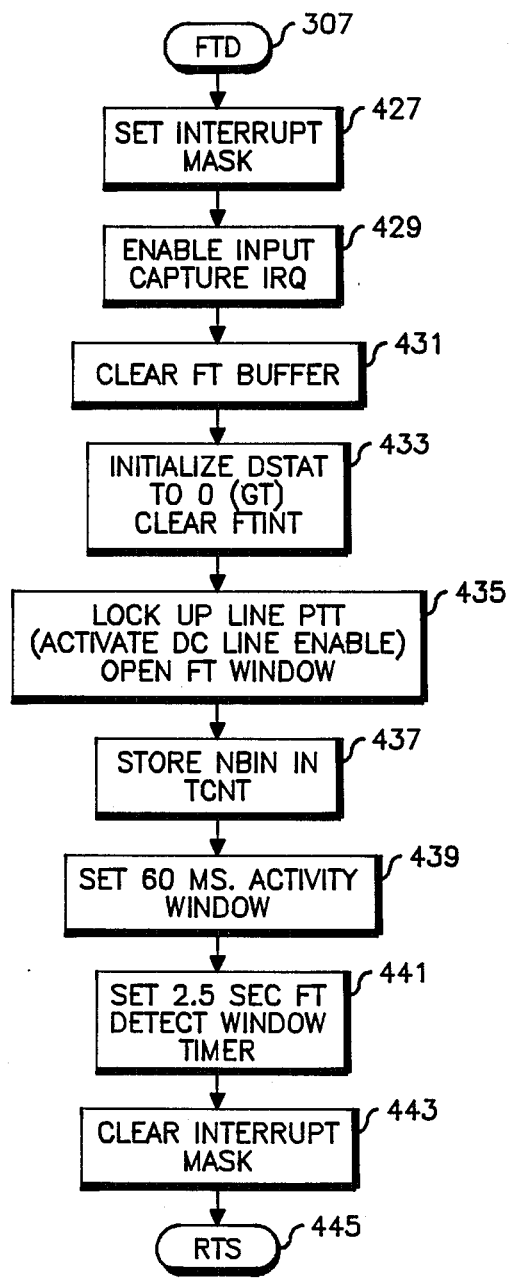

FIG. 10 shows a detailed flow diagram for the function tone detect program module (FTD) 307. This module handles background tests for the function tone decode state which is associated with state one of the state variable. This state is entered into after a high level guardtone has been detected. It enables the function tone decode foreground task and locks down the line push-to-talk signal. The system will stay in this state until a function tone is received. If an invalid tone or a time-out condition occurs, the system will return to the PTT decode state. If a valid tone is received, the system will move on to the function tone execute state which is associated with a value of two for the state variable. The FTD module is also a two-pass subroute. If FTD has not been accessed by the EXEC module earlier, the system will access the first entry point to FTD 307 which begins with item 427 which sets an interrupt mask to prevent an interrupt while FTD is active. Item 429 then enables an internal microprocessor input associated with an internal timer and stores the value of the current timer state. Item 431 then clears the function tone buffer of any existing information while item 433 initializes a tone status word (DSTAT) to zero indicating that guardtone has been received and clears function tone foreground variables which are used to detect the presence of a function tone. Item 435 activates the line push-to-talk control and enables the function tone window control (F) of FIG. 3. Item 437 stores the value of a counter in a RAM location, and the program control proceeds to item 439 which initializes an internal activity timer and passes program control to item 441 which sets the function tone detect window timer. All of the function tone detect variables have been initialized at this point, and item 443 clears the interrupt masks and passes program control back to the background exec module 303 shown in FIG. 7.

DSTAT is generated and updated by a tone decoding foreground routine. This routine places a binary representation of the tone that has been detected in four bits of DSTAT. The routine also sets a valid tone bit and an activity bit based upon preset limit values for detected tones.

Figure 11:
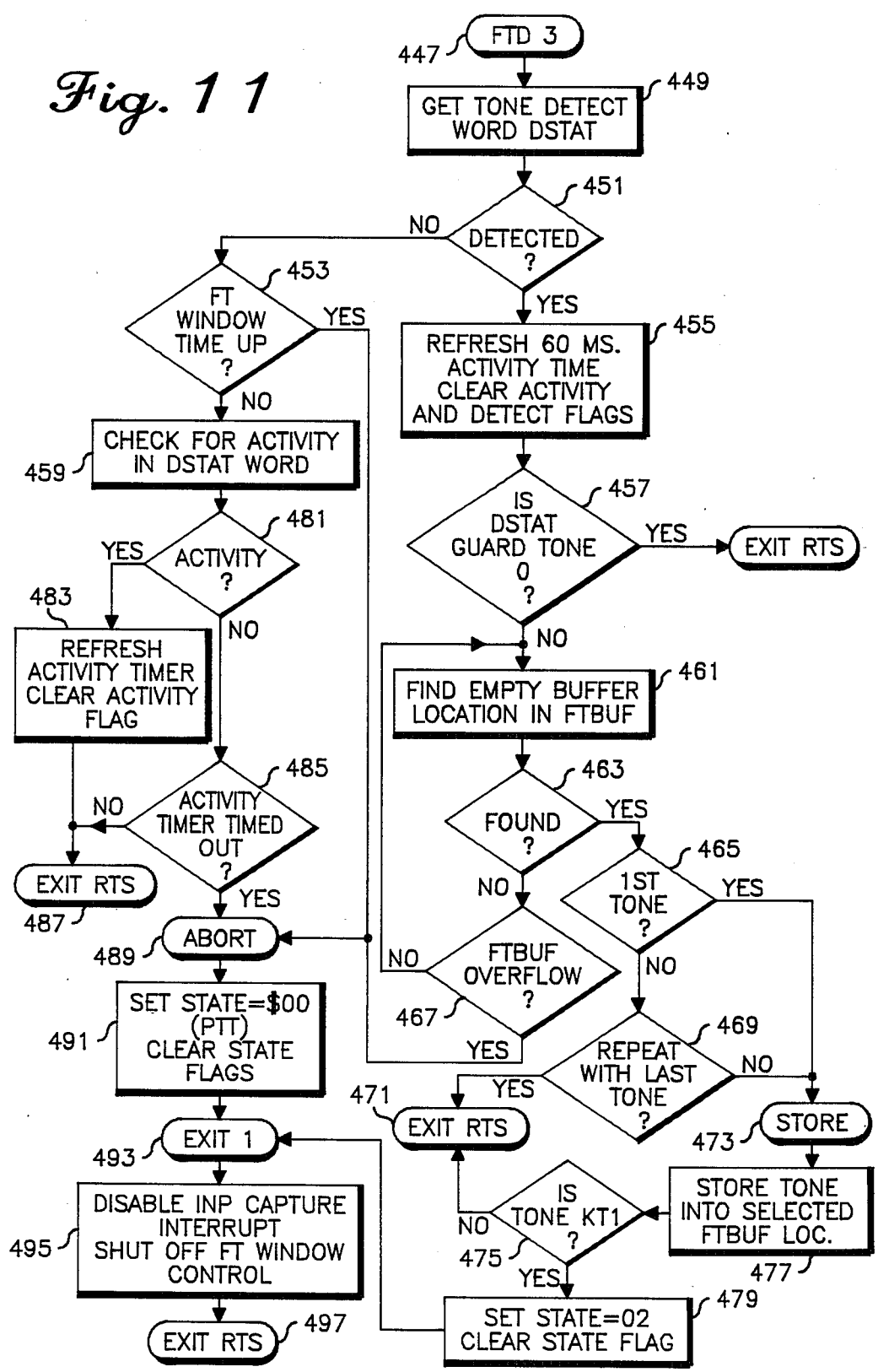

FIG. 11 shows a detailed flow diagram of the FTD+3 utility module which is accessed anytime FTD is indicated by the state variable and FTD has been accessed previously to initialize the FTD variables. FTD+3 447 begins with item 449 which recalls the tone detect status word DSTAT. The tone detect status word DSTAT provides an indication of whether a tone has been detected, as well as containing a binary representation of the tone which has been detected. In other words, every simulcast station decoder is equippped to decode as many as sixteen tones. If one of these tones has been detected, its binary representation will be stored in DSTAT. Once the DSTAT status word has been accessed, program control passes to decision 451 which examines the DSTAT status word. If DSTAT indicates that a tone has been detected, program control proceeds to 455 which refreshes the activity timer and clears the activity and detect flags. Program control then proceeds to decision 457 which examines the DSTAT status. If DSTAT indicates it is guardstone that has been detected, program control returns to the EXEC subroutine. If guardtone has not been detected, item 461 searches for an empty buffer location in the function tone buffer. Decision 463 determines that the function tone buffer has been found. Decision 465 examines the tone stored in the particular FT location. If the tone in the function tone buffer indicates this is the first tone, item 477 stores the tone into a selective function tone buffer location. If the tone is not the first tone decision 465 proceeds to decision 469. Decision 469 examines the tone in the function tone buffer. If a duplication of the previous tone is indicated, then decision 469 passes program control to the background EXEC subroutine shown in FIG. 7. If decision 469 indicates that this is not a duplication with previous tones, then the tone is stored by item 477. Decision 475 examines the tone stored in the function tone buffer location. If a final keying sequence tone is indicated, then program control proceeds to item 479 which updates the state variable, adjusts it for a value of two and clears the state flag. If a keying sequence tone was not indicated, decision 475 returns program control to the EXEC subroutine. Returning to item 479, once the state variable has been updated and the state flag cleared, program control proceeds to the exit subroutine 493.

Returning now to decision 451, if the DSTAT status byte indicates that a tone has not been detected, program control proceeds to decision 453 which examines the function tone time window interval to see if the time for detecting a function tone has elapsed. If the time has not elapsed, program control proceeds to item 459 which checks the DSTAT status word for any new activity. If activity has been detected, decision 481 passes program control to item 483 which refreshes the activity timer and clears the activity flag. Program control then returns to the EXEC background subroutine. If activity timer time has elapsed, program control proceeds to item 491 which re-initializes the state variable and clears the state flags and enters the exit subroutine 493. Exit subroutine 493 begins with item 495 which disables the capture interrupt and shuts off the function tone window controls. Program control subsequently reverts to the EXEC background subroutine. Returning now to decision 463, if an appropriate function tone buffer location cannot be found, program control passes, to decision 467 which examines the function tone buffer for an overflow indication. If a function tone buffer overflow is indicated, program control passes to the abort subroutine 491 as discussed earlier. If a function tone buffer overflow is not indicated, program control returns to item 461 to continue searching for an empty buffer location in the function tone buffer.

Figure 12A:
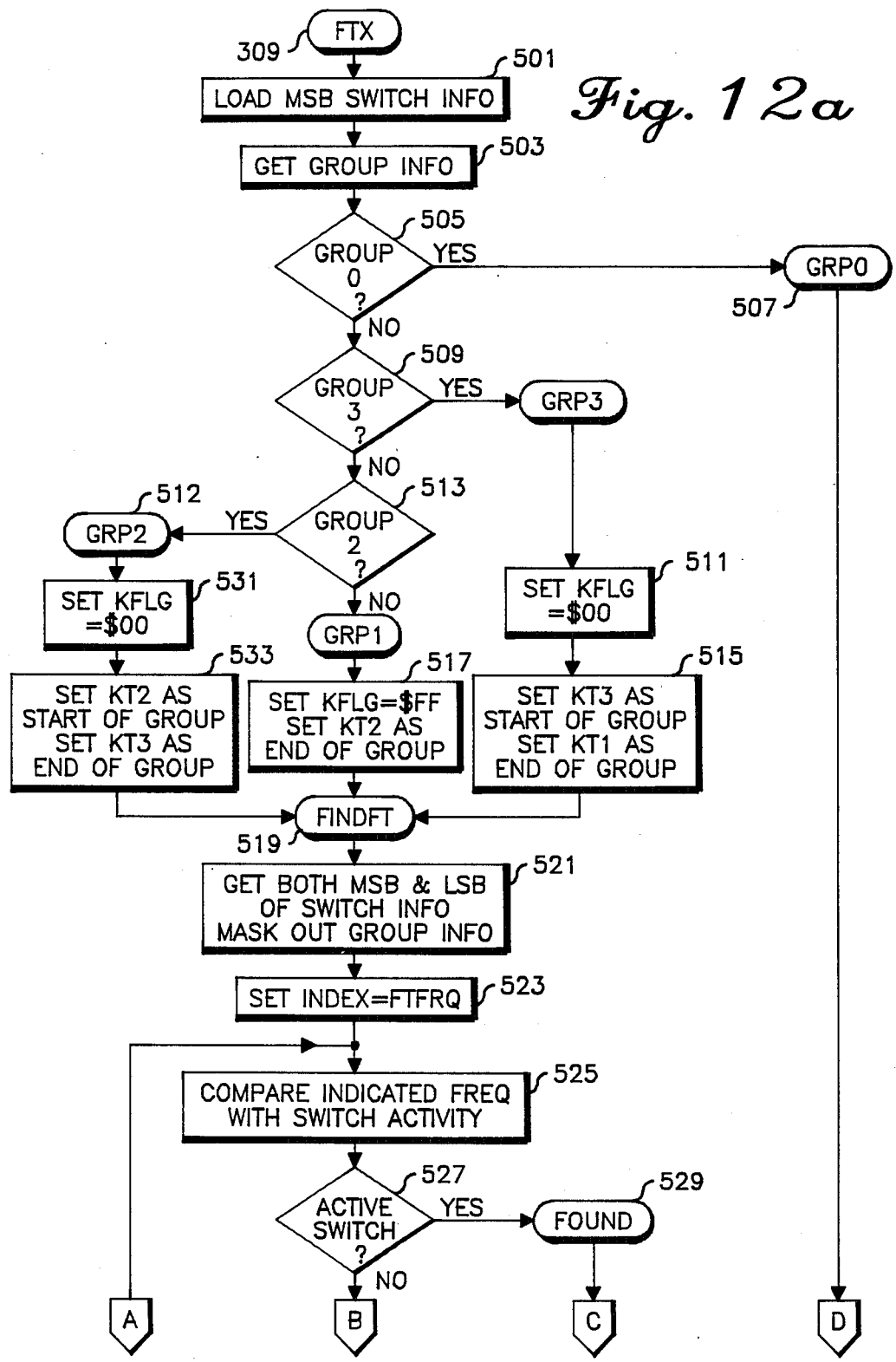

FIGS. 12A and B show the function tone executor module (FTX) 309. The FTX module is invoked by the EXEC background subroutine when the state variable has been set to 2. The function tone detector module causes the state variable to be set to 2 when a valid sequence of function tones is received. Its purpose is to search this stack of function tone numbers and decide whether a valid transmitter knock down tone was decoded in the stack. If so, the transmitter is inhibited, if not, the transmitter is set up for key-up. This module contains a first pass to decide which of the functions tones to look for, and a second pass to find the proper tone numbers.

Figure 12B:
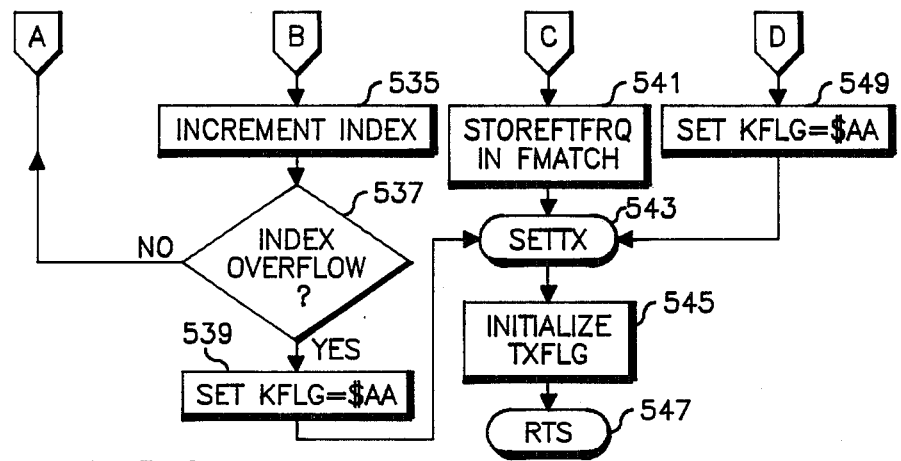

According to FIG. 12A the first time the FTX module is activated, FTX 309 begins with item 501 which reads the simulcast station control decoder programming switches for function tone group information. This information is derived from switches within the simulcast decoder. Item 503 then accesses the group information from the function tone group switches. The program proceeds to decision 505 which examines the group information to determine if the particular simulcast station has been programmed for group 0. If group 0 information has been detected, the group 0 subroutine 507 is invoked. The group 0 subroutine begins with item 549 as shown in FIG. 12B. If group 0 is not detected the program continues to decision 509 which examines the group information to determine whether group 3 information has been programmed into the station control switches. If group 3 information has been detected, the program proceeds to item 511 which resets the group flag information and then selects item 515. Item 515 sets the KT3 keying sequence tone as a start of group tone and sets KT1 as an end of group tone. The program then proceeds to the function tone programmer routine (FINDFT) which begins at 519. Returning now to decision 509, if group 3 information was not detected, the program will proceed to decision 513. If group 2 information is detected, the group 2 subroutine 512 will be invoked and item 531 will set the group flag to zero and proceed to item 533 which will set keying sequence tone 2 (KT2) as a start of group tone and set keying sequence tone 3 (KT3) as an end of group tone. The program will then proceed to the FINDFT routine 519. Returning to decision 513, if group 2 information was not detected, group one is indicated and item 517 will set the group flag byte to $FF and establish keying sequence tone 2 as an end of group tone. The program will then proceed to FINDFT 519.

The function tone programmer subroutine FINDFT begins with item 521. Item 521 loads the function tones information from the paging system decoder switches. Item 523 then sets the function tone frequency index equal to the values indicated in the function tone switch information. Program control proceeds to item 525 which examines the simulcast programming switches for any activity and compares this activity with the indicated frequency. Item 525 examines the first function tone switch that is activated. If an active switch is detected, decision 527 selects the found subroutine 529. If an active switch was not detected, decision 527 will select item 535 which will increment the frequency index for the next function tone frequency. Program then proceeds to item 537. If an index overflow is not indicated, the program will again select item 525. If an index overflow is indicated item 539 will be selected and the group flag will be set to $AA. Item 539 will then select subroutine SETTX 543. SETTX begins with item 545 which will set the transmit flag to $$FF indicating a keyed-up condition which the normal state for a remote simulcast transmitter unless instructed to de-key. Item 547 will then return to the EXEC background routine shown in FIG. 7. Returning now to decision 527, if switch activity was detected, the found subroutine 529 will be selected which begins with item 541. Item 541 is invoked when an active switch is found. This item will store the tone which has been found in a RAM location FMATCH for matchup with decoded tones which are fetched in the second pass of the FTX module. Item 541 then selects the SETTX routine 543.

Figure 13A:
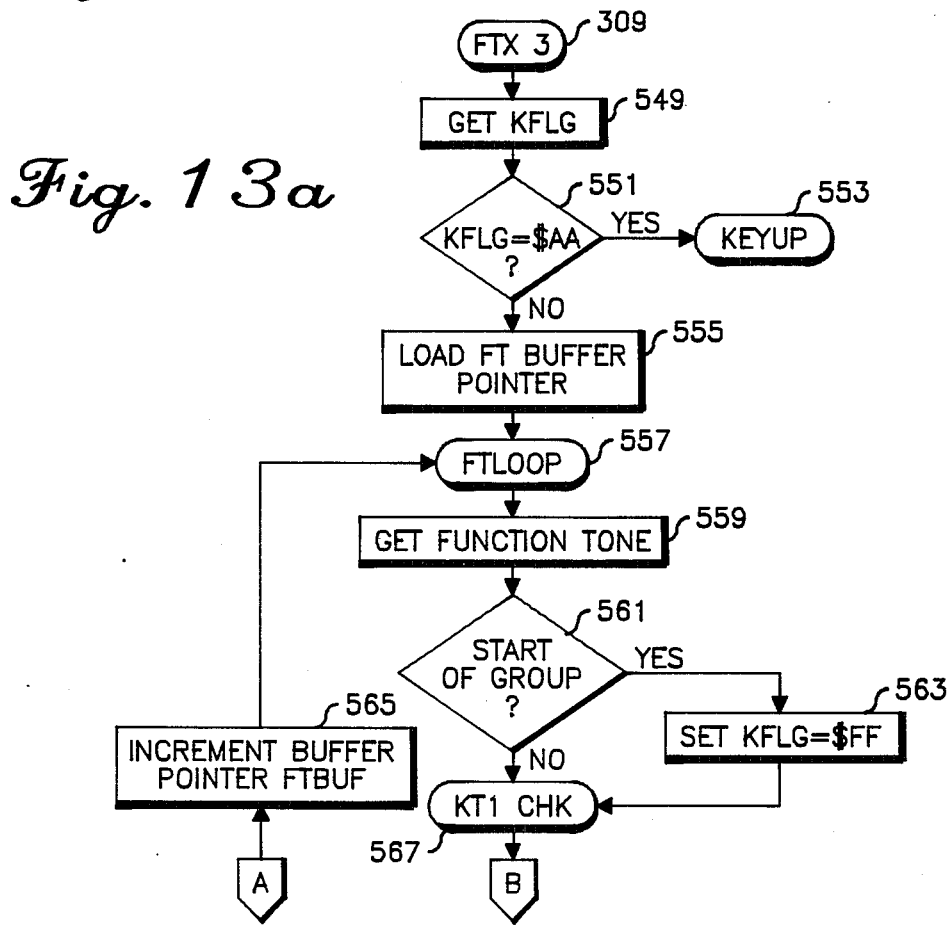
Figure 13B:
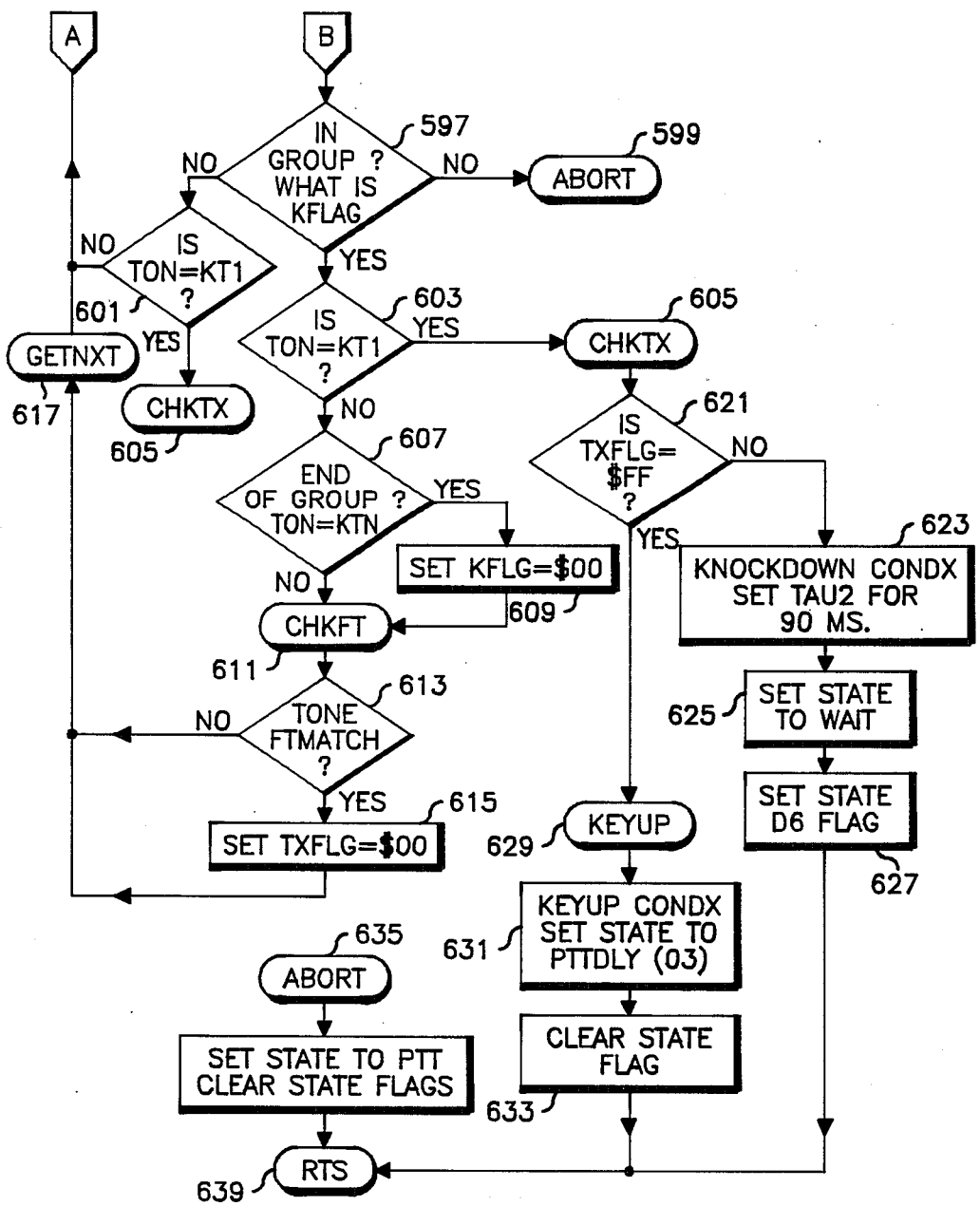

FIGS. 13A and B show a detailed flow diagram for the FTX+3 subroutine which is invoked after the FTX routine has been invoked previously. FTX+3 matches the function tone selected in pass one with one of the tones in the stack received from the FTD module. FTX+3 begins with item 549 which reads the current group flag information. Decision 551 examines the group flag information. If the group flag status byte indicates group zero information, then a transmitter key-up is indicated, and the key-up subroutine 553 will be selected. If group zero information is not indicated in the group flag status plate, decision 551 will select item 555 which loads the current's function tone buffer pointer to the start of the function tone stack to search for the proper group and knock-down tones. The program then enters the function tone loop 557 which begins with item 559 which begins by selecting the first function tone. The program proceeds to item 561 which examines the first function tone to determine if start of group tone has been detected. If a group start tone has been detected, the program will select item 563 which will reset the group flag status byte to $FF and select the keying sequence tone one check routine 567. If a start of group tone has not been detected, item 561 will directly select the keying sequence tone one check routine 567. Keying sequence tone check routine 567 shown in FIG. 13B begins with decision 597. Decision 597 examines the group flag to determine if the keying sequence tone detected is in the desired programming group. If the group tone detected is equal to $AA, the program will proceed to the abort subroutine 599 or return program control to item 565 based on the condition of the group flag. If the group tone detected was in the desired group, decision 603 examines the tone to see if the final keying sequence tone has been detected. If keying sequence tone one has been detected, decision 603 will select subroutine check-transmit 605 which begins with decision 621. If keying sequence tone one was not detected, the program will proceed to decision 607 which examines the group tone to determine if an end-of-group tone has been detected. If an end-of-group tone has been detected, decision 607 will select item 609 which resets the group flag $00 and selects the check function tone subroutine 611. If an end-of-group tone has not been detected, decision 611 will directly select the CHKFT subroutine 611. The check function tone subroutine begins with decision 613 which examines the detected function tone to determine if a function tone match exists. If a function tone match has not been detected, decision 613 will select the get next (GETNXT) subroutine 617 which returns program control to item 565 in FIG. 13A. If a function tone match has been detected, item 615 will be selected and the transmit flag will be reset to $00. Returning now to the check transmit subroutine 605, decision 621 examines the transmit flag to determine if a $FF condition exists. If this condition does not exist, item 623 will instruct the simulcast transmitter that a knock-down condition exists and sets the DC line disable for 90 ms. Item 625 will then set the state variable for a wait condition and item 627 will reset the state flag D6. State flag D6 is used in the wait 3 subroutine (315A) of FIG. 15B to indicate the origin of entry as FTX for service of PTTDLY on DC line disable. Program control will then return to the background EXEC subroutine shown in FIG. 7. Returning to decision 621, if a transmit flag equal to $FF condition does exist, the key-up routine 629 will be selected. The key-up 629 begins with item 631 which adjusts the system state variable to indicate the PTTDLY routine should be selected. Item 633 then clears the state flag and returns program control to the background EXEC subroutine of FIG. 7. Returning now to decision 597, depending on the condition of the group flag variable decision 597 could alternately select decision 601 if the beginning of group tone (KPLAG=$00) has not been detected. Decision 601 would then check to see if the final keying sequence tone was detected. If not, GETNXT routine 617 will be selected. If the final keying sequence tone one was detected, the check-transmit subroutine 605 will be selected.

FIGS. 14A and 14B show a detailed flow diagram for the line PTT lockup delay handler module 313 and 313A. This module is activated when the state variable has been set to 4 and provides delay between the receipt of a final keying sequence one tone by the simulcast paging system control decoder in the event of unlocking line PTT. This delay is 90 milliseconds and is needed to prevent the loss of line PTT during the silent period between keying sequence tone and the binary transitions in a binary or analog paging keying sequence. It invoked by the FTX module if the keying sequence tone 1 is received and the transmitter is not disabled. If PTT has not been selected during a prior intervale the EXEC routine will select PTT delay 313 since the PTT delay routine does not require the initialization of any variables PTT delay 313 immediately returns program control to the EXEC subroutine. If PTT has been selected earlier when the state variable has been set to 4 the EXEC routine will select PTT DLY3 313A which begins with item 569 which immediately sets the state variable equal to 3 and sets the state flag. The program proceeds to item 571 which sets the timer to generate a 90 millisecond time interval and than subsequently returns program control to the EXEC background subroutine shown in FIG. 7.

FIGS. 15A and 15B show detailed flow diagrams for the paging system decoder key-up handler routine (KEY). This module keys the simulcast station provided the keyed A+ delay is active. Once keyed, the module exits to the wait state for as long as A+ delay is present. The key state is invoked if local PTT or remote PTT or a valid keying tone is detected by other modules. If the key module has not been previously invoked, the EXEC routine will select KEY routine 311 since the KEY routine does not require initialization of variables key routine 311 immediately returns program control the EXEC routine. If the key routine has been previously addressed, the EXEC routine will select the KEY 3 subroutine 311A which begins with item 575. Item 575 reads the value of the delayed keyed A+ flag P13 from port 1. Program control proceeds to decision 577 which examines the delayed keyed A+ flag. If the flag is active, program control proceeds to the GO sub-routine 581. If the flag is not active, program control proceeds to item 579 which generates a 5 millisecond time delay. Program control proceeds to item 589 which selects delayed key A+ flag. Decision 591 examines the flag if the flag is active it will pass to the GO routine 581. If the flag is still not active, decision 591 will select item 593 which sets the state variable to 0, clears the state flag, and resets the function tone window control and the DC line disable. Item 593 then passes program control to the EXEC subroutine 303 shown in FIG. 7. Referring now to the go routine 581, item 583 activates the transmitter oscillator ground by grounding output P16. The program then proceeds to item 585 which sets the state variable equal to 5 to access the weight utility module. Item 587 then passes system D6 status flag, and returns program control to the background EXEC routine 303.

Figure 16A:
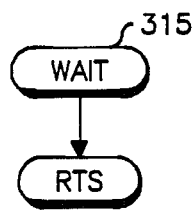
Figure 16B:
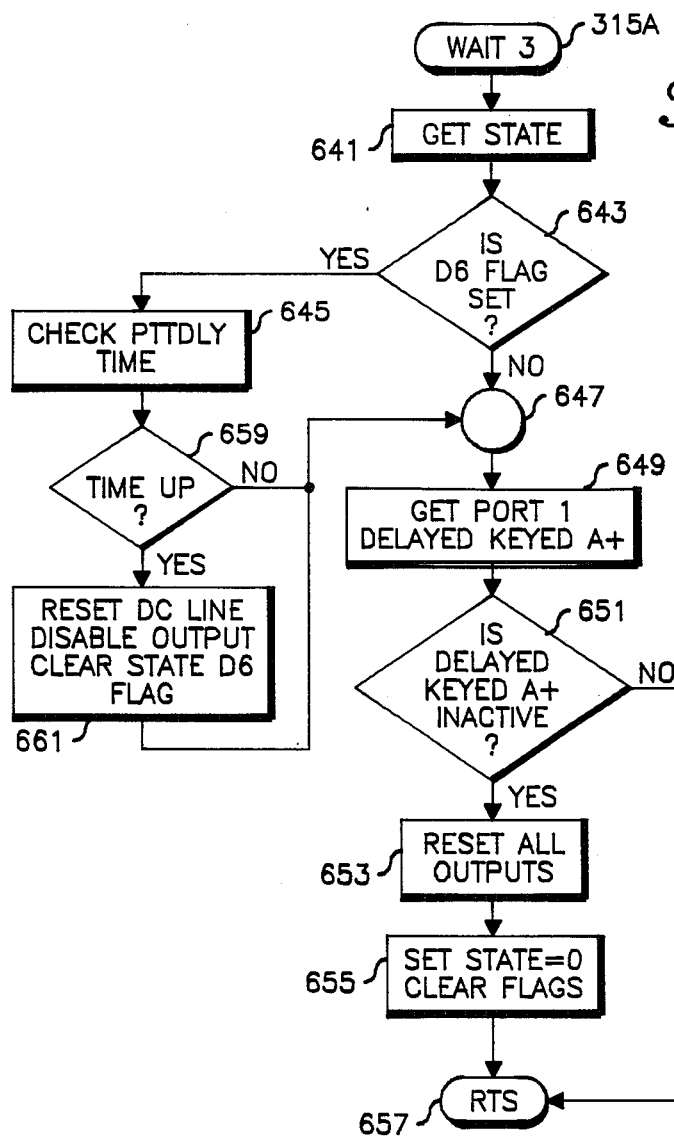

FIGS. 16A and 16B are detailed flow diagrams of the paging system decoder wait de-key handler utility module. This module provides the paging system decoder de-key function when the appropriate signal is received from hardware. While waiting for the de-key signal it also unlocks the line push-to-talk after an appropriate time. This module is invoked by a valid transmitter key-up. FIG. 16A shows the wait routine which is accessed by the EXEC module, if the wait routine has not been previously accessed. Since this routine does not require the initialization of variables, WAIT routine 315 returns program control to the EXEC background routine 303. If wait has been previously addressed, the EXEC module will select WAIT 3 routine 315A as shown in FIG. 16B. Wait 3 begins with item 641 which checks the state flag variable D6 for a valid indication of a keying sequence tone. If a valid keying sequence tone has been detected decision 643 will select item 645. If the keying sequence tone status bit D6 has not been set, program control will pass to item 649 which checks port 1 pin 13 for delayed keyed A+ activity. If delayed keyed A+ signal has been inactive, decision 651 passes program control to items 653 and 655 which reset all outputs and returns rogram control to the EXEC subroutine. If activity was detected at P13 program control immediately passes from decision 651 to the EXEC subroutine 303 of FIG. 7. Returning now to decision 643. If D6 flag of the status byte was set item 645 will be selected which checks the PTT delayed timer for current value. Decision 659 then passes program control to item 649 if the time has not elapsed, program control is passed to item 661 which resets DC line disable outputs clears the state flag D6 and then returns program control to item 649. The state flag D6 is set by the PTT delay module which sets the DC line disable timer that indicates to this module that a key up was indicated by a valid keying tone 1 tone detect. The flag is cleared after a PTT delayed time out.

In summary a paging system decoder capable of decoding a series of timed tones and pauses in accordance with a predetermined signalling scheme has been described. The paging system decoder receives the signals generated by the paging system encoder and selectively activates or deactivates a paging simulcast transmitter. Each paging system decoder is individually programmable to respond to a unique function tone/keying sequence tone and receives the encoded information through a conventional paging communication link. Accordingly, other modifications, uses and embodiments may be apparent to one skilled in the art without departing from the spirit and scope of the principles of the present invention.

What is claimed is:

1. A paging simulcast transmitter remote control decoder for receiving signals from a paging simulcast transmitter remote control encoder for selectively activating or deactiviatng a simulcast transmitter, the signals including a plurality of transmitter control tones comprising individual transmitter control information followed by encoded paging information, and for selectively applying an analog or binary paging signal sequence to said simulcast transmitter in response to the encoded paging information generated by said encoder, said decoder comprising:
 (a) means for receiving signals generated by the paging simulcast remote control encoder;
 (b) means for detecting the presence of a first transmitter control tone indicating that a paging sequence is initiated;
 (c) means responsive to detection of said first transmitter control tone for detecting the presence of a second transmitter control tone indicating that selected paging simulcast transmitter should inhibit transmitting subsequent paging information;
 (d) means responsive to detection of said second transmitter control tone for selectively deactivating said selected paging simulcast transmitter;
 (e) means for detecting the presence of a third transmitter control tone indicating the beginning of encoded paging information; and
 (f) means responsive to detection of said third transmitter control tone for selectively activating an analog or binary transmission mode in said decoder.

2. The apparatus of claim 1 wherein said second transmitter control tone detecting means includes a microprocessor.

3. The apparatus of claim 1 wherein said receiving means comprises a radio-frequency receiver.

4. A method for decoding paging simulcast transmitter remote control signals from a paging simulcast transmitter remote control encoder for selectively activating or deactivating a selected simulcast transmitter, and for selectively applying an analog or binary paging information signal to said simulcast transmitter in response to the remote control signals generated by said encoder, said method comprising the steps of:
 (a) receiving the remote control signals generated by the paging simulcast remote control encoder, wherein the remote control signals include a first transmitter control tone, a second transmitter control tone, and a third transmitter control tone followed by the analog or binary paging information signal;
 (b) detecting the presence of the first transmitter control tone indicating that a paging sequence is initiated;
 (c) detecting the presence of the second transmitter control tone indicating that said selected simulcast transmitter should inhibit transmitting the subsequent analog or binary paging information signal;
 (d) selectively deactivating said selected simulcast transmitter in response to detection of said second transmitter control tone;
 (e) detecting the presence of the third transmitter control tone indicating the beginning of the analog or binary paging information signal; and
 (f) selectively activating in the decoder either an analog or binary transmission mode in order to transmit the analog or binary paging information signal respectively to said selected simulcast transmitter in response to detection of said third transmitter control tone.

5. The method of claim 4, further including the steps of:
 (g) enabling the binary transmission mode in response to the binary paging information signal; and
 (h) enabling the analog transmission mode in response to the analog paging information signal.

6. A decoder for controlling a paging system transmitter in a plural population of selectively enabled transmitters, each transmitter associated with a decoder for directing the transmission of paging information comprising analog information signals and binary information signals, said decoder comprising:
 means responsive to receive and decode coded information, wherein the coded information includes control information signals followed by paging information signals, and further wherein said control information signals direct said decoder to control a corresponding transmitter in the plural population of selectively enabled transmitters;
 means responsive to the detection and decoding of the coded information for directing said decoder to disable the coresponding transmitter while leaving at least one enabled transmitter;
 means responsive to the enabled transmitter for directing said decoder to establish a path to the enabled transmitter for the transmission of the paging information; and means responsive to the absence of the coded information for deactivating the enabled transmitter to terminate the transmission of paging information.

7. The decoder of claim 6, wherein said means responsive to the enabled transmitter selectively enables a binary signal path to the enabled transmitter or transmitting binary information in response to detecting a received binary information signal.

8. The decoder of claim 7, wherein said means responsive to the enabled transmitter selectively enables an analog signal path to the enabled transmitter for transmitting an analog information signal in response to detecting and receiving an analog information signal.

9. The decoder of claim 6, wherein the control information signals include a sequential series of transmitter control signals for directing the enabling of a selected transmitter.

10. The decoder of claim 9, wherein the series of transmitter control signals includes a first control signal for initially activating the plural population of transmitters.

11. The decoder of claim 10, wherein the series of transmitted control signals includes a group of second control signals, each second control signal of the group associated with a corresponding transmitter for selectively disabling the corresponding transmitter.

12. The decoder of claim 11, wherein the series of control signals includes a third control signal for enabling each initially activated transmitter not disabled by said second control signal.

13. The decoder of claim 12, wherein the series of control signals includes an absence of coded information for a predetermined period to deactviate each transmitter in the plural population of selectively enabled transmitters.

14. The decoder of claim 13, wherein said transmitter control signals are comprised of transmitter control tones.

15. A method of decoding encoded information for providing information to a transmitter in a plural population of selectively enabled transmitters, each transmitter associated with a series of transmitter control information and furher wherein the encoded information includes the transmitter control information and paging information, wherein the paging information comprises analog paging information and binary paging information, said method comprising the steps of:

(a) detecting and decoding the received encoded information for providing the transmitter control information and paging information;

(b) selectively enabling the transmitter correlating to the received transmitter control information;

(c) establishing a signal path to the enabled transmitter corresponding to the received paging information signal;

(d) transmitting the paging information to a plurality of communication receivers; and (e) disabling transmission of information from the enabled transmitter in response to the absence for a predetermined period of time of encoded information.

16. The method of claim 15, wherein step (b) of selectively enabling further includes the steps of:

(f) detecting a first control signal included in the transmitter control information to initially activate each transmitter in the plural poopulation of transmitters;

(g) detecting a second control signal for disabling a transmitter correlating to the second control signal; and (h) detecting a third control signal for enabling each transmitter not previously disabled by the second control signal.

17. The method of claim 16, wherein step (c) of establishing further includes the steps of:

(i) establishing a binary signal path in response to detecting binary information; and (j) establishing an analog signal path in response to detecting analog information.

18. The method of claim 15, wherein the plurality of transmitters includes a plurality of link transmitters being distributed in the path of the encoded information, and wherein step (a) of detecting further includes the steps of:

(k) relaying the encoded information through the link transmitters distributed in the path of the encoded information; and (l) waiting a predetermined period of time corresponding to the number of link transmitters distributed in the path before initiating detection of the transmitter control information.

* * * * *

UNITED STATES PATENT AND TRADEMARK OFFICE
CERTIFICATE OF CORRECTION

PATENT NO. : 4,772,887
DATED : September 20, 1988
INVENTOR(S) : Dunkerton et al.

It is certified that error appears in the above-identified patent and that said Letters Patent is hereby corrected as shown below:

Column 16, line 63, delete "coresponding" and insert --corresponding--

Column 17, line 34, delete "deactviate" and insert --deactivate--

Column 17, line 45, delete "furher" and insert --further--

Column 18, line 21, delete "poopulation" and insert --population--

Signed and Sealed this

Twenty-first Day of February, 1989

*Attest:*

DONALD J. QUIGG

*Attesting Officer*    *Commissioner of Patents and Trademarks*